L. BECKER.
STRAW-CUTTER.
No. 178,713. Patented June 13, 1876.
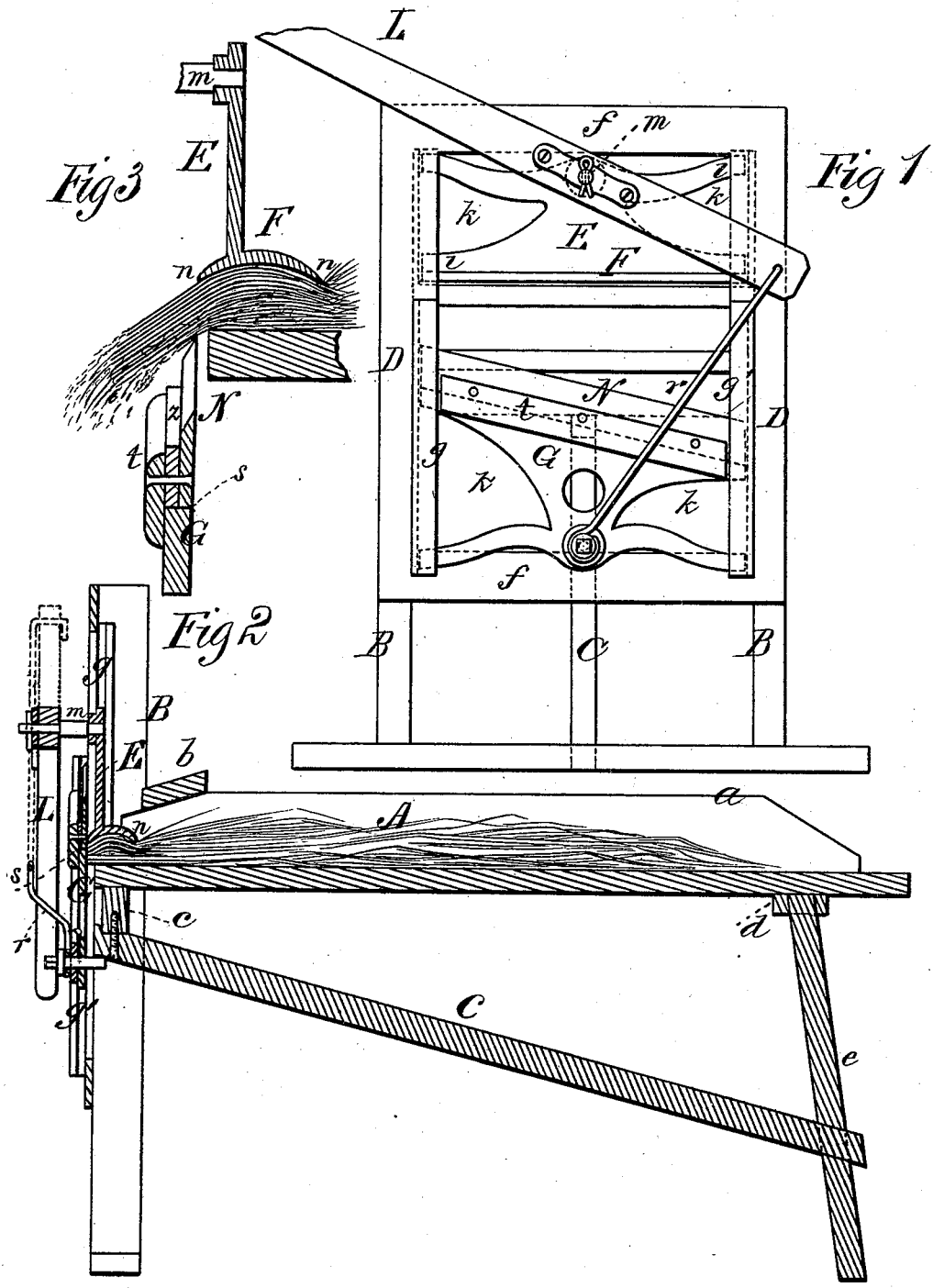
WITNESSES
Villette Anderson
Francis J. Masi
INVENTOR
Leander Becker.
E. W. Anderson,
ATTORNEY

UNITED STATES PATENT OFFICE.

LEANDER BECKER, OF YORK, PENNSYLVANIA.

IMPROVEMENT IN STRAW-CUTTERS.

Specification forming part of Letters Patent No. 178,713, dated June 13, 1876; application filed May 13, 1876.

*To all whom it may concern:*

Be it known that I, LEANDER BECKER, of York, in the county of York and State of Pennsylvania, have invented a new and valuable Improvement in Feed-Cutters; and I do hereby declare that the following is a full, clear, and exact description of the construction and operation of the same, reference being had to the annexed drawings, making a part of this specification, and to the letters and figures of reference marked thereon.

Figure 1 of the drawings is a representation of an end view of my improved feed-cutter. Fig. 2 is a longitudinal vertical section of the same, and Fig. 3 is a detail vertical section of the descending gate and knife-carrier frame.

This invention has relation to feed-cutters; and it consists in the construction and novel arrangement of the rising knife and frame; the descending gate for confining the straw or other substance passing through the box, worked downward by a lever, which also lifts the knife and its frame; the concave pressure-bar of the gate and the means of adjustment for the knife, whereby its edge may be brought, as wear occurs, sufficiently close to the edge of the concave pressure-bar to insure efficiency in the cut, as hereinafter fully shown and described.

In the accompanying drawings, the letter A designates the box or hopper of the feed-cutter, having side walls $a$ and an inclined guide-board, $b$, transversely arranged at the knife end of the box. B B designate the front supports, into which are let the transverse bar $c$, to which the cutting end of the box is secured. Under the rear or feeding end of the box is transversely secured a bar, $d$, into which is mortised a support, $e$. C designates a prop, extending from the front bar $c$ in an inclined direction to the support $e$, its lower end being secured to the latter. D represents a metallic frame, which is secured to the supports B, its cross-bars $f$ extending between the supports and bracing them. The inner vertical edges of the frame are provided with parallel ways or grooves $g$ $g'$, respectively, designed to receive the sliding ends of the gate and knife-frame. The upper and lower ends of these grooves are open, in order that the sliding parts may be readily removed when necessary. E represents the descending gate. This may conveniently be made of metal, of sufficient size to span the opening between the side walls, bottom, and guide-board of the box. In order to secure lightness, the lateral portions of the gate may be made with openings or spaces $k$. The ends $l$ of the gate extend into the grooves $g$ of the frame D. Along the lower edge of the gate, and forming its margin, extends the pressure-bar F, which is concave transversely on its under side, so that when it descends upon the straw or other substance its two edges $n$ $n$ bite, and the straw is held securely and prevented from slipping.

As the straw is allowed to rise in the concavity of the bar, the ends to be cut will be somewhat inclined downward, and thus placed in a favorable position for the operation of the knife. A fulcrum, $m$, is attached to the gate for the operating-lever L.

G indicates the frame of the knife. This may be made of metal, and is designed to be connected to the lever by a connecting-rod, $r$, having its attachment at the lower end of the frame. The lateral portions of this frame or plate are lightened by the formation of openings $k$, which also enable the bearings in the slide-grooves in this frame, as well as in the pressure-gate, to be placed at a sufficient distance vertically to secure an even and steady movement. The upper portion of the knife-frame, in which the knife N is seated, is inclined transversely or from one side of the box to the other, to provide for a drawing cut. The inner side of this upper part is recessed and shouldered, as indicated at $s$ in the drawings, so that the knife, which is designed to be secured to the bearing or flange $t$ of the frame, can be readily adjusted toward the edge of the pressure-bar of the gate as it wears away, by means of packing or wedges $z$, applied between the knife and the bearing.

The knife is operated by means of the lever L, which causes it to rise, cutting upward against the straw, which is firmly held against it by the pressure-bar of the gate.

When the lever is pivoted to the gate, as above set forth, the knife and pressure-bar adjust themselves automatically, in coming together, to the amount of feed in the cut, compressing it, whether small or large, to the degree of compactness required for the efficient operation of the knife.

What I claim as new, and desire to secure by Letters Patent, is—

1. The combination of the pressure-gate E and knife-frame G, having reciprocating motion toward and from each other, with the lever L, having its fulcrum $m$ on the said gate, and the connecting-rod $r$, substantially as specified.

2. The pressure-gate E, having a transversely concave pressure-bar F, whereby a double bite is obtained, together with a downward bend of the ends of the feed to be cut off, substantially as specified.

In testimony that I claim the above I have hereunto subscribed my name in the presence of two witnesses.

LEANDER BECKER.

Witnesses:
J. W. SPANGLER,
A. G. FRY.